G. HITCHCOCK.
CHECK VALVE.
APPLICATION FILED APR. 16, 1915.
1,167,180.
Patented Jan. 4, 1916.
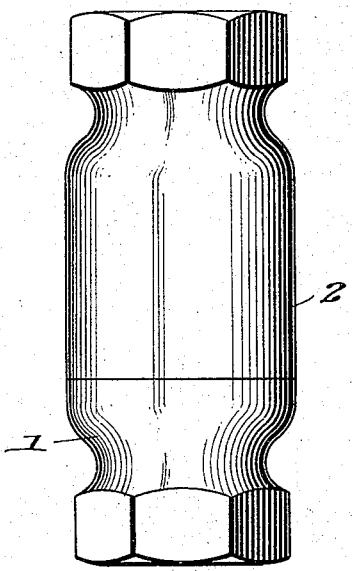
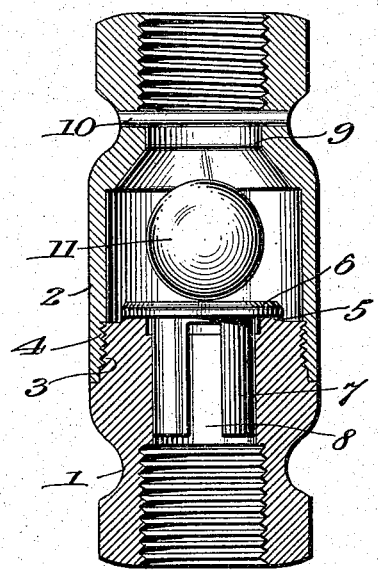
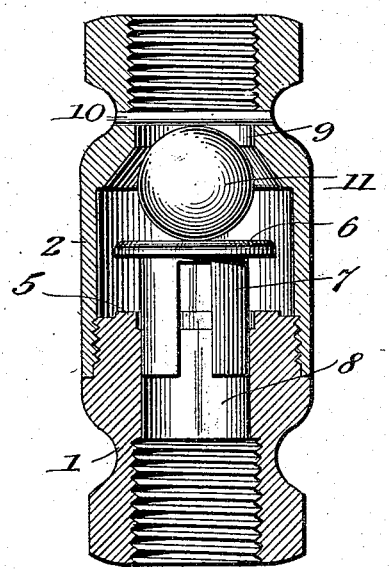
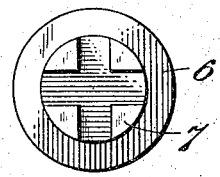
Inventor:
George Hitchcock
By Louis Baeger
his Attys.

UNITED STATES PATENT OFFICE.

GEORGE HITCHCOCK, OF FLINT, MICHIGAN, ASSIGNOR OF ONE-THIRD TO RAYMOND S. HALLIGAN, OF FLINT, MICHIGAN.

CHECK-VALVE.

1,167,180.  Specification of Letters Patent.  Patented Jan. 4, 1916.

Application filed April 16, 1915. Serial No. 21,763.

*To all whom it may concern:*

Be it known that I, GEORGE HITCHCOCK, a citizen of the United States, residing at Flint, in the county of Genesee and State of Michigan, have invented certain new and useful Improvements in Check-Valves, of which the following is a specification.

My invention relates to an improvement in check-valves, and comprises four main parts, namely an outer shell made in two parts adapted to screw together and constitute a valve-casing and each of which has an internal valve-seat, a valve, and a ball between these parts, the valve seating itself on one seat, and the ball holding it seated until the fluid pressure is sufficient to lift both and force the ball against the other seat, whereupon a free passage is formed for the escape of the fluid.

In the accompanying drawings:—Figure 1 is a view in side elevation; Figs. 2 and 3 are sectional views in their two extreme positions; and Fig. 4 is an end view of the valve.

The part 1 is provided with a screw-thread 3 adapted to turn in the thread 4 of the part 2. Part 1 is also provided with a valve-seat 5, and the valve 6 fits this seat, and the slotted valve-stem 7 is fitted to the bore 8 in which it is capable of moving freely up and down.

The bore of section 2 is internally tapered and reduced at 9, and across the restricted portion is a pin 10, and the ball 11 is confined within the bore or chamber formed thereby, being held at all times from the tapering portion by striking the pin 10 which insures a free passage around the ball at all times.

It is understood the ball does not quite fill the space between the pin and the end of the valve, sufficent play being provided for the valve and ball to lift when the pressure below the valve is greater than the weight of the ball and valve, which latter re-seats itself by gravity when the fluid pressure is less than their combined weight.

Thus is formed a check-valve which is easily and inexpensively constructed, comprising a minimum of parts, not apt to get out of order, which can be easily applied or removed from the pipe, and which will admit of being quickly taken apart and the valve and ball renewed, if found desirable, at any time.

I claim:—

A check valve comprising two parts, internally bored and screwed together with threaded orifices at their outer ends, one part having a valve seat, a valve slidable in the bore and adapted to rest normally upon the seat, a ball confined within the check valve, and adapted to reseat the valve, and a pin extending across the bore of one part to limit the outward movement of the ball and valve.

In testimony whereof I affix my signature, in the presence of two witnesses.

GEORGE HITCHCOCK.

Witnesses:
 FRED J. MAGINN,
 JNO. MURDOCK.

Copies of this patent may be obtained for five cents each, by addressing the "Commissioner of Patents, Washington, D. C."